Dec. 14, 1965  J. F. REYNOLDS ETAL  3,223,193
VEHICLE WITH REVERSIBLE CONTROLS
Filed March 2, 1964  5 Sheets-Sheet 1
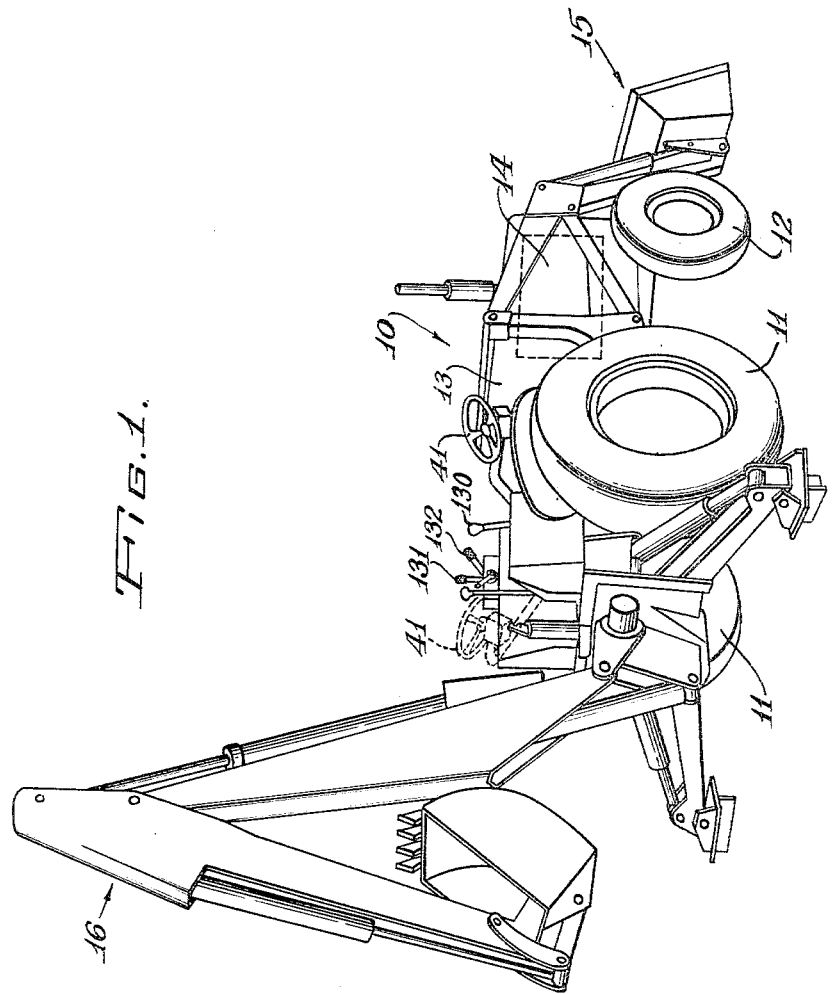
Inventors:
John F. Reynolds
Tommy A. Middlesworth
Richard R. Steingas
By Walter G. Greoy
Atty.

Dec. 14, 1965    J. F. REYNOLDS ETAL    3,223,193
VEHICLE WITH REVERSIBLE CONTROLS
Filed March 2, 1964    5 Sheets-Sheet 2
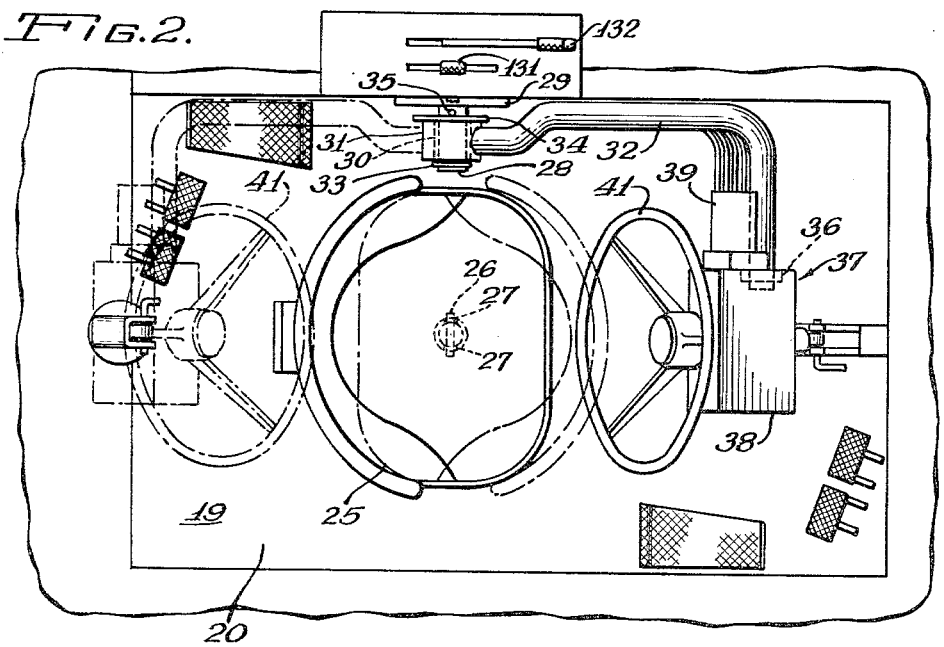
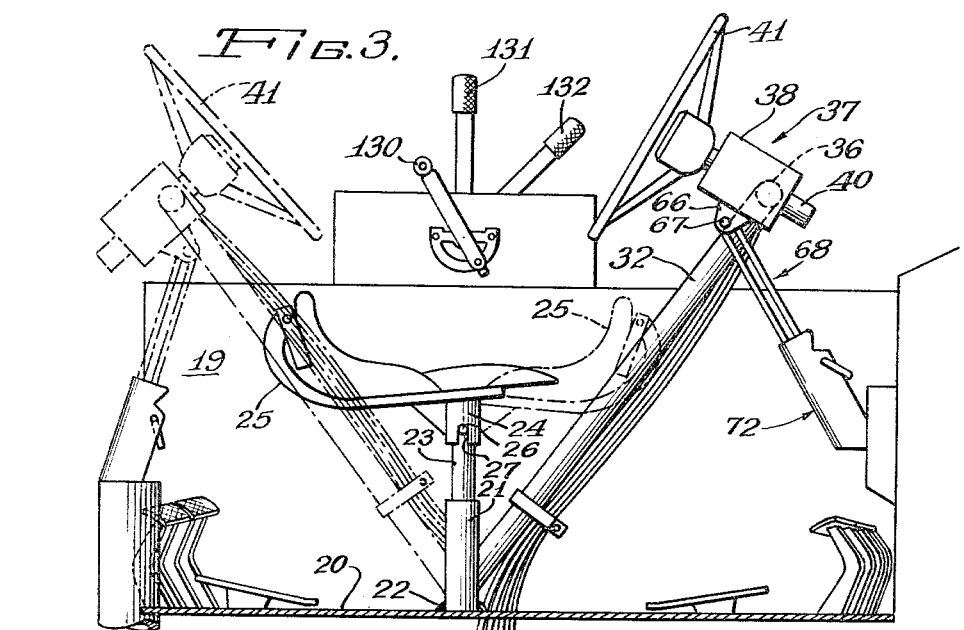
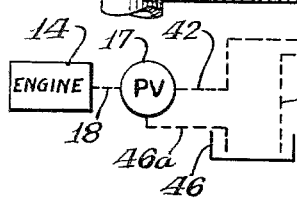
Inventors:
John F. Reynolds
Tommy A. Middlesworth
Richard R. Steingas
By Walter G. Mason
Atty.

Inventors:
John F. Reynolds
Tommy A. Middlesworth
Richard R. Steingas
By Walter & Gregory
Atty.

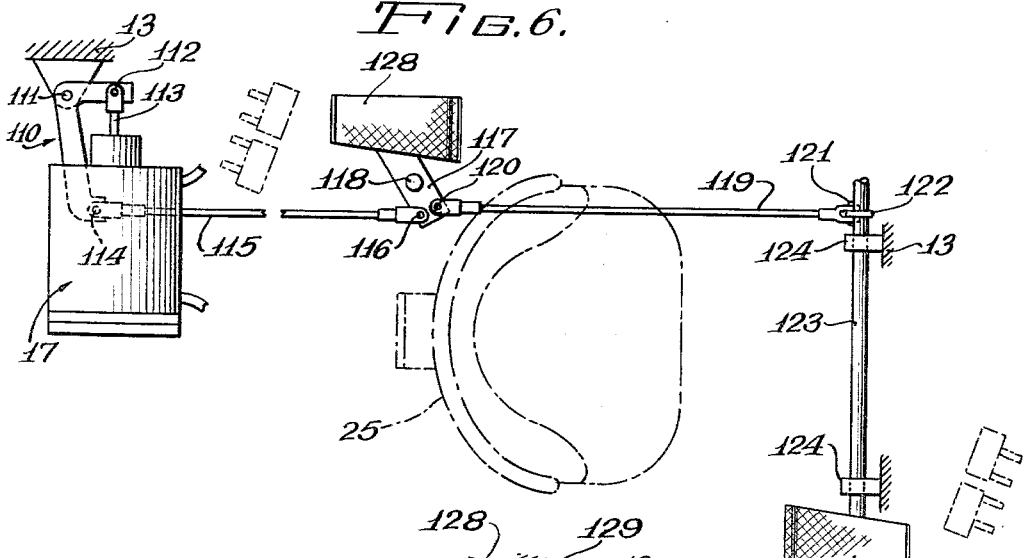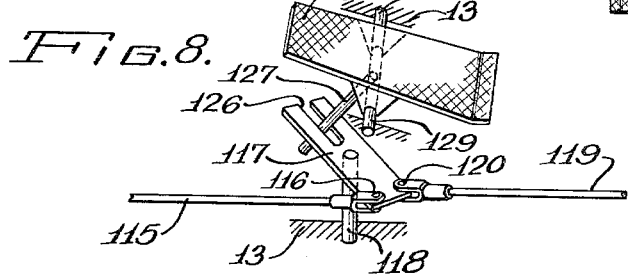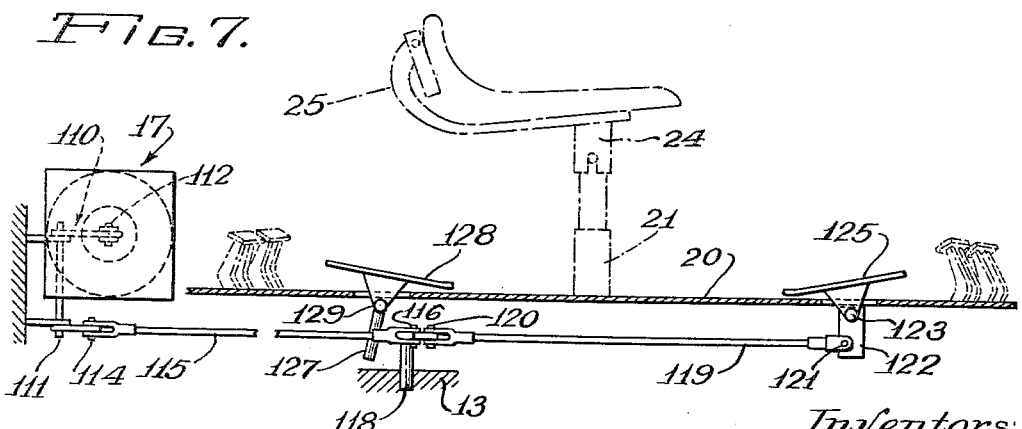

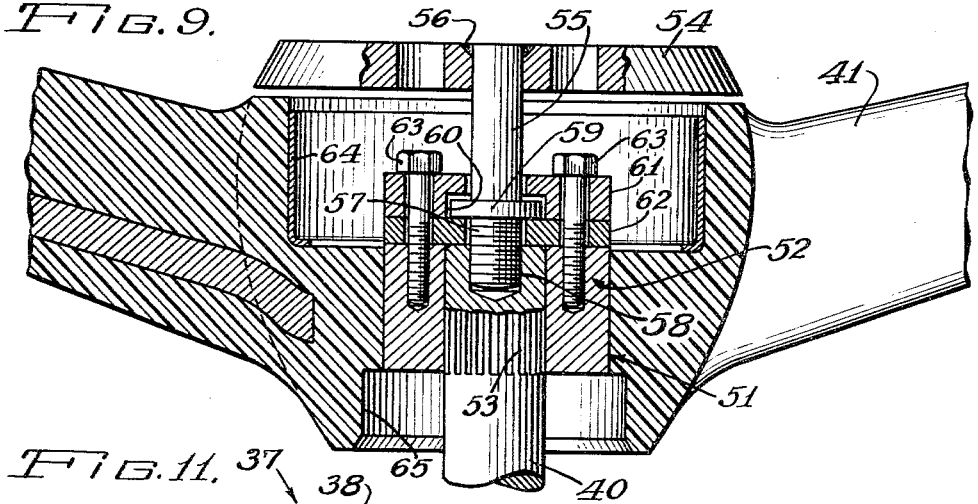
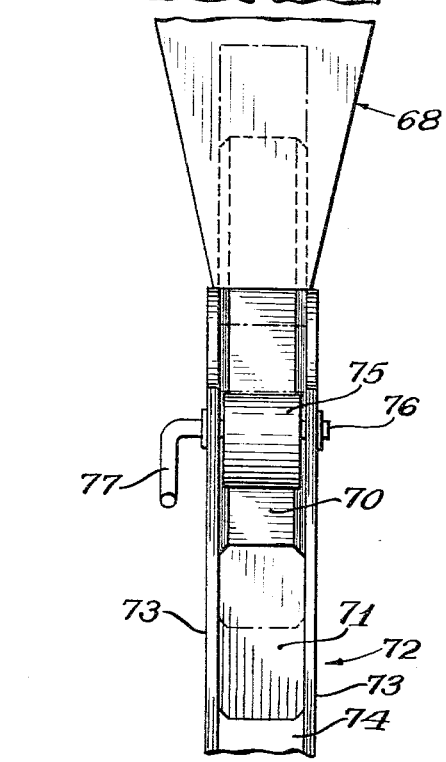
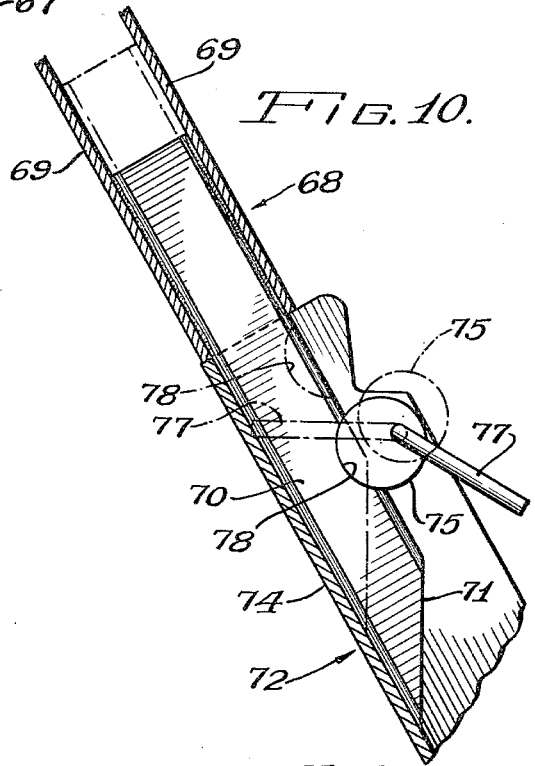

United States Patent Office 3,223,193
Patented Dec. 14, 1965

3,223,193
VEHICLE WITH REVERSIBLE CONTROLS
John F. Reynolds, La Grange, Tommy A. Middlesworth, Hinsdale, and Richard R. Steingas, Naperville, Ill., assignors to International Harvester Company, Chicago, Ill., a corporation of New Jersey
Filed Mar. 2, 1964, Ser. No. 348,739
10 Claims. (Cl. 180—77)

This invention relates to vehicles of the self-propelled type, but more particularly it is concerned with the arrangement of an operator's station and the controls therein and specifically with the adaptability thereof for reversing the operator facing position of certain such controls so that the vehicle may be operated in a forwardly or a rearwardly direction with equal facility at the selection of the operator.

In certain types of agricultural and road-working vehicles it is frequently desirable that they be adapted for operation at the same speed in a rearwardly as well as a forwardly direction, without having to effect a turn-about of the vehicle. In order to accomplish this dual directional driving while still permitting the operator to always be facing the direction of movement of the vehicle it is necessary to reverse the position of some operating controls thereof, including the operator's seat, the steering control wheel and certain other controls such as those for the speed governing and braking devices. Heretofore, various arrangements have been proposed for accomplishing such ready reversibility in a variety of different types of vehicles, resulting usually in varying degrees of complexity of the associated structures and frequently without general application to a large variety of vehicles. In agricultural and other earth-working vehicles the question of space occupied by an operator's station or compartment is generally of paramount importance because of the premium consistently placed on such space; hence when vehicles of this character are equipped with reversible controls the question of space occupied by an operator's compartment must be seriously studied. This is of particular interest because in many of the prior proposed arrangements for such purpose the addition of reversible controls usually brought about an increase in the fore-and-aft space occupied by the operator's control station or compartment which, of course, was objectionable since it tended to limit the general applicability of the specific arrangement proposed.

It is a principal object, therefore, of the present invention to provide a simplified and improved arrangement of an operator's control compartment, which is of such character and construction that the vehicle containing said compartment is readily adapted in a minimum of time for full operation in a forwardly as well as in a rearwardly direction.

Another object is to provide a vehicle operator's station which occupies a very minimum of fore-and-aft spacing therein and yet provides ample room for seating and steering controls which are reversible so as to permit the driver thereof to operate the vehicle while seated facing in the direction of travel of the vehicle regardless of its direction of movement.

A further object is to provide in a vehicle equipped with hydraulic steering controls actuable by a steering wheel device disposed in the proximate vicinity of an operator's control compartment thereof means for displacing said steering wheel fore-and-aft of said compartment, and means for reversing the position of the operator's seat therein and additionally providing duplicated foot-operated controls spaced fore-and-aft in the compartment so as to facilitate operation of the vehicle in a forwardly as well as a rearwardly direction.

A still further object is to provide in a hydraulically powered and controlled vehicle adaptable for operation in a forwardly and a rearwardly direction, an operator's control compartment wherein the operator's seat is substantially centrally positioned of the fore-and-aft dimension thereof and is reversible in its facing position, and having a steering control mechanism displaceable fore-and-aft of the compartment for use with either facing position of the seat, and further having additional vehicle controls operable from either seat facing position for controlling operation of the vehicle in either direction of travel thereof.

The foregoing and other objects and features of the invention will become apparent as the disclosure is more fully made in the following detailed description of a preferred embodiment of the invention as illustrated in the accompanying sheets of drawings in which:

FIGURE 1 is a perspective view of a vehicle wherein the proposed invention has been incorporated;

FIGURE 2 is a fragmentary plan view of an operator's station fashioned according to the invention;

FIGURE 3 is an elevational view of the operator's station shown in the preceding view; and includes a schematic representation of the hydraulic circuit associated therewith;

FIGURE 6 is a plan view of the speed governing foot control pedals and the associated motion-transmitting linkage;

FIGURE 7 is an elevational view of the speed governing control shown in the preceding view;

FIGURE 8 is a fragmentary perspective of a portion of the foot control shown in the two preceding views;

FIGURE 9 is a fragmentary sectional view in enlarged scale of the mounting means for the operator's steering wheel;

FIGURE 10 is a fragmentary and partially sectional view of the supporting socket and latching mechanism associated with the reinforcing support bracket for the steering wheel assembly; and FIGURE 11 is a fragmentary plan view of the supporting socket and latching mechanism shown in the preceding view.

Figure 4:
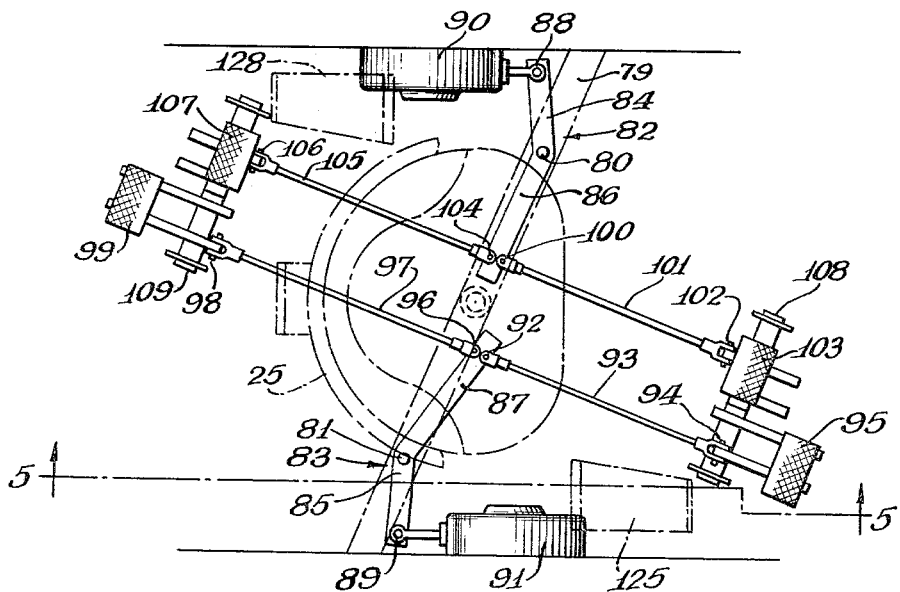
FIGURE 4 is a plan view of the brake operating foot control pedals and certain motion-transmitting linkage associated therewith, one set of said pedals being shown in a depressed position.

The present invention may, of course, be utilized in various types of vehicles, as for instance earthworking machines, agricultural vehicles, material-handling machines, industrial tractors and similar like vehicles.

For purpose of illustration, the invention is depicted in the drawings herein as applied to a hydraulically powered and controlled self-propelled vehicle in the form of an industrial tractor which has had installed on opposite ends thereof earthworking devices. An industrial tractor, indicated in its entirety by the reference numeral 10, may include pairs of traction wheels 11 and steerable wheels 12 (only one of the latter of which is shown) suitably mounted on opposite ends of a chassis structure 13, and a power-propelling unit such as the engine 14. A front end loader device such as the unit indicated at 15 may be suitably mounted on the forwardly facing end of the tractor, while a back-hoe device such as indicated at 16 may be suitably mounted on the rearwardly facing end of the vehicle. Since these earth-moving devices are generally conventional in construction and operation, and since they are not specifically pertinent to the inventive concepts taught by the present invention, it was felt no further description or explanation of the details of construction and operation thereof was necessary. It will be understood, of course, that suitable control and operating mechanisms will be provided to effect operation of any such device utilized with the vehicle but, again, since these components are not particularly vital to a proper understanding of the invention they need not be further illustrated or described in detail herein. Likewise, it will be understood, suitable driving mechanism will be provided for transmitting the power developed by the engine into drive for the traction wheels. In the present instance it is envisaged that the traction wheels will be hydraulically driven through suitable hydraulic motor means (not shown) motivated by hydraulic fluid pressure from a pump such as is indicated schematically at 17 in the drawings (FIGURE 3) and which, in turn, may be driven by the engine 14 through suitable connecting drive means as represented diagrammatically at 18. A vehicle which shows a suitable and acceptable drive mechanism of this character is depicted in the co-pending U.S. patent application, Serial No. 310,593, assigned to the same assignee as the present invention. In a vehicle of this character it will be appreciated that provision must be made to operate the vehicle with the driver or operator facing either forwardly or rearwardly as required. The present invention provides facilities for accomplishing such operations with equal facility and with a minimum of alteration in the position of the control components thereof. The manner in which this is accomplished will best be understood by reference to FIGURES 2–11 of the drawings wherein details of the operator's station or compartment 19 are illustrated in greater detail.

Referring now to the drawings it will be seen that the operator's station or compartment comprises an area disposed laterally intermediate the traction wheels 11, 11 and extends fore-and-aft of chassis structure 13 which latter structure, in turn, supports the compartment. Said station or compartment contains the appropriate vehicle controls so arranged as to be readily available to the operator in either facing position chosen and includes a floor structure 20 suitably supported on chassis structure 13 by conventional supporting means (not shown).

A pedestal-like support 21 supportably carried by the compartment floor 20 may be secured thereto by suitable affixing means such as the welds 22 shown at the base thereof. An extension 23 of said pedestal has the free end thereof received in an apertured hub-like member 24 and the opposite end of said hub has fixedly secured thereto an operator's seat assembly 25. A laterally extending pin 26 secured in extension portion 23 is received at the opposite ends thereof in radially spaced slots 27, 27 in the hub 24. With this arrangement it is merely necessary to raise the seat 25 sufficiently for slots 27, 27 to clear pin 26 then rotate the seat to its forward or rearward facing position and thereafter re-engage said pin and slots to fixedly position the seat in its selected position. The seat support, preferably, is disposed centrally of the operator's station relative to both the lateral and fore-and-aft boundaries of said station.

A pin or stud 28 fixedly anchored in a bracket 29 suitably affixed to chassis structure 13, proximate one side of operator's station 19 and laterally displaced from seat support 21, journals a sleeve bearing 30 mounted in a bushing 31 to which is fixedly secured a boom-like support arm 32. A snap-ring 33 positioned in an annular groove or recess proximate the outer end of said pin and a washer 34 disposed in abutting relation with a pin 35 secured in stud 28 serve to limit axial movement and thereby prevent axial displacement of said arm relative to said stud in a manner well understood. The opposite end of support arm 32 has fixedly mounted thereon at 36 a control valve assembly, indicated in its entirety at 37, which includes a casing 38 having a conventional hydraulic steering control valve indicated at 39 therein, and a rotatable spindle 40 for operating said valve by suitable conventional gear means (not shown). Said spindle 40 extends outwardly beyond opposite sides of casing 38 and receivingly accommodates an operator's steering wheel 41 on either end of the said projecting spindle. Conduits 42, 43, 44, 45 communicatively interconnect control valve 39 into a hydraulic circuit extending between pump 17, reservoir 46 and opposite ends of a double-acting hydraulic cylinder or ram 47, while a conduit 46a interconnects said reservoir and pump 17. Said ram is mounted at one end thereof by a support 48 anchored on the chassis structure 13, while the opposite end of the ram has projecting therefrom a piston rod 49 which is pivotally attached to a tie-rod indicated schematically and fragmentarily at 50 which, in turn, is interconnected between steerable wheels 12, 12 in conventional manner, all of which is so well understood that further descriptive details and illustration thereof are believed unnecessary.

The steering wheel 41 has an axial bore 51 therein that receives in a press fit relationship a mounting member 52 and an aperture in said mounting member is internally splined as shown at 53 so as to mate with external splines on either end of spindle 40. A large hand nut 54 has a shank portion 55 suitably secured thereto by conventional means such as the welds 56, and the opposite end of shank 55 is threaded at 57 for accommodation in a threaded recess 58 in the end of spindle 40. The shank 55 has fashioned thereon by suitable means a collar 59 which is received in a recess 60 in a cap or closure member 61 and a washer or spacer member 62 is positioned between said closure member and the end of mounting member 52, while cap screws 63 provide means for securing the closure member 61, washer 62 and mounting member 52 in a fixed relation. Counterbore 64 and 65 may be provided at opposite ends of bore 51 to facilitate maintenance or adjustment of the steering wheel mounting means. In order to position the steering wheel on one end of the spindle or the other, both ends being identically fashioned with splines and internal threads, the wheel is initially positioned so that the splines of the mounting member slidably engage the mating splines of the spindle end and thereafter the threaded shank 57 is threaded into the recess in the spindle. Turning nut 54 by hand then operates by way of collar 59 to pull the steering wheel up tight on said spindle. To remove the steering wheel it is only necessary to turn nut 54 in the opposite direction thereby forcing the threaded shank out of the threaded recess in the spindle while collar 59 forces the wheel outwardly along the mated splines, and when said shank is free the wheel may be slipped off the spindle splines and repositioned on the opposite end of the spindle, if so desired.

Fixedly secured to and depending from one exterior face of valve casing 39 is a pair of ears or lugs 66, 66 which pivotally support an elongated pin 67, and a reinforcing bracket, indicated generally at 68, suitably pivotally secured to said pin. Said bracket as illustrated, comprises a strap wrapped around the pin and fashioned to provide two reinforcing members 69, 69 which are generally tapered as indicated (FIG. 11) from a broad width proximate the pivot pin to a narrow width at their opposite ends where they straddle and are fixedly secured by conventional welding or brazing means to a bayonet-like shaft member 70, the opposite end of which is tapered or bevelled at 71. The tapered end of shaft 70 is adapted for insertion in a socket member indicated generally at 72, and one such socket member is disposed forwardly and one rearwardly of the operator's compartment 19. The socket 72 is suitably supported by and anchored to the chassis structure 13 and each such socket includes a body member fashioned with opposite side walls 73, 73 and a bottom connecting wall member 74 and arranged to provide a generally U-shaped channel that receives the shaft 70 at the end of bracket 68. An eccentrically mounted wedging roller 75 is pivotally mounted in the side walls 73, 73 of said socket by means of a pivot pin 76 one end of which is overturned to provide a handle 77. A detent notch 78 in one surface of shaft 70 is positioned so as to accommodate the roller 75 when handle 77 is rotated thereby preventing accidental displacement of said shaft out of said socket and thus providing a simplified latching mechanism. The entry position of the shaft in the socket as well as the position of the roller and handle components at the time of entry are all shown in broken lines in FIGURE 10. It will be appreciated now that when the bracket 68 is positioned in a selected socket 72 and locked therein there is provided in cooperation with the boom-like support arm 32 a very firm and stable reinforcing or support means for control valve assembly 37 and attached operator's steering wheel 41 so as to permit use of the latter wheel with either facing position of seat 25.

The foot-operated controls, duplicated fore-and-aft permit operation of the vehicle in both the forwardly and rearwardly facing positions of the operator. An angularly positioned and laterally extending beam member 79 suitably mounted at opposite ends thereof on chassis structure 13 has pivotally mounted thereon at the spaced-apart pivots 80, 81 a pair of bellcranks 82, 83 having outer and inner arms 84, 85 and 86, 87 respectively. The outer ends of arms 84, 85 of said bellcranks are connected at 88 and 89 to the respective braking devices 90, 91 disposed at opposite sides of the vehicle and adapted for operatively braking a proximate traction wheel. One such braking device suitable for this purpose which cooperates with the transmission associated with a respective wheel is the commercially marketed twin disc product of Auto Specialties Company of St. Joseph, Michigan. The inner end of inner arm 87 of bellcrank 83 has pivotally connected thereto at 92 one end of a link rod 93 the opposite end of which is pivotally connected at 94 to a forwardly disposed foot pedal 95, while another pivotal connection at 96 connects link rod 97 to said inner arm and the opposite end of said link is pivotally connected at 98 to a rearwardly disposed foot pedal 99. Similarly the inner end of arm 86 of bellcrank 82 has pivotally connected thereto at 100 one end of link rod 101 the opposite end of which is pivotally connected at 102 to a forwardly disposed foot pedal 103, while another pivotal connection at 104 connects link rod 105 to said latter inner arm and the opposite end of said link is pivotally connected at 106 to a rearwardly disposed foot pedal 107.

Figure 5:
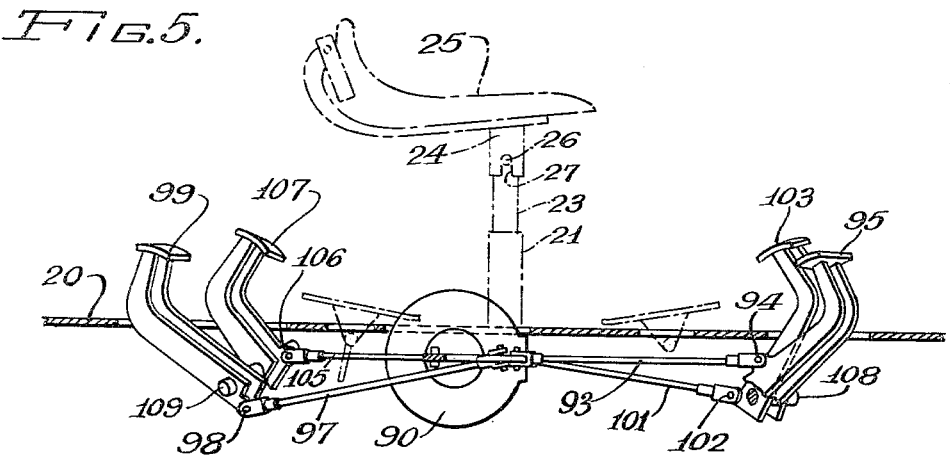
FIGURE 5 is an elevational view of the brake controls shown in the preceding view and looking generally along the line 5—5 of FIGURE 4.

The forwardly disposed foot pedals 95, 103 are pivotally mounted on a shaft 108, while the rearward pedals 99, 107 are pivotally mounted on a shaft 109, both shafts of which may be suitably supported by conventional mounting means not shown on chassis structure 13 below floor 20 of the operator's station with said pedals projecting upwardly through suitable openings in said floor. The forward pivot 94 of link 93 and the rearward pivot 106 of link 105 are pivotally connected to the respective pedals 95, 107 at points above the axis of rotation of the respective pedals so that when force is applied to said pedals the associated links 93, 105 are placed in tension, while the forward pivot 102 of link 101 and the rearward pivot 98 of link 97 are pivotally connected to the respective pedals 103, 99 at points below the axis of rotation of the respective pedals so that when force is applied to the latter pedals the associated links are placed in compression. In this manner force applied to the forward pedals will produce the same braking reaction on braking devices 90, 91 as when force is applied to the rearward pedals, hence the actions or movements of the operator in applying pedal pressure will be the same regardless of which direction the operator faces. This, of course, is particularly desirable in order to avoid confusion when the operator shifts from one facing position to the other. In FIGURES 4 and 5 it will be noted that the right side braking device 91 and the associated linkage is shown in a brake-engaged or operative position whereas the left side components are shown as being at rest.

The speed governing device in the vehicle drive arrangement envisaged herein may be the variable hydraulic pump 17 which provides fluid pressure to the traction wheel motors. In a conventional pump of this character, as is well-known, the output therefrom may be varied by changing the angle of operation of the swashplate therein, hence the proposed invention provides simplified means whereby this can be accomplished from either facing position of the operator. Since the details of construction of pumps of this character are so well-known it was felt no further showing thereof need be made of such construction in order to provide a proper understanding of the instant invention. A bellcrank 110 pivotally mounted at 111 on the chassis structure 13 has one arm thereof pivotally connected at 112 to a plunger rod 113 which constitutes the actuating member for the volume control mechanism of pump 17, while the other arm of the bellcrank is pivotally connected at 114 to one end of a rod-like link member 115. The opposite end of link 115 is pivotally connected at 116 to a horizontally disposed plate-like actuator member 117 pivotally mounted at 118 to chassis structure 13. Another rod-like link member 119 has one end pivotally connected at 120 to actuator plate 117 while the opposite end of the latter link is pivotally connected at 121 to a crank arm 122 the opposite end of which is mounted on a shaft 123 and constrained for rotation therewith. Bearings 124, 124 spaced therealong serve to journal shaft 123 and said bearings, in turn, are suitably mounted on the chassis structure. A foot pedal 125 mounted on the opposite end of shaft 123 is also constrained for rotation with said shaft. The end of actuator plate 117 opposite that to which links 115, 119 are attached has a slot-like recess 126 extending inwardly therefrom and is dimensioned to receive a rod-like member 127 rigidly affixed to a foot pedal 128 pivotally mounted at 129 to chassis structure 13. Both pedals 125, 128 are disposed above the compartment floor 20 while the depending elements thereof project through suitable openings in said floor to the interconnected linkage. It will readily be seen that when either the forward pedal 125 or the rearward pedal 128 are depressed the links 115, 119 are caused to move and incident thereto to rotate bellcrank 110 whereby the control elements of pump 17 are motivated.

Additional controls, of course, may be provided as required for operation of any specific vehicle and the auxiliary equipment associated therewith. As illustrated, three additional hand-operated controls have been selected as being of interest herein. Control handle 130 which is conventionally mounted at one side of the operator's compartment may be utilized to control the throttle actuating mechanism of the vehicle's power plant, while control handles 131, 132 likewise conventionally mounted at one side of the operator's compartment may be operatively connected by suitable mechanism to the controls for the hydraulic motors in the respective wheels of the vehicle. However, since these mechanisms are generally conventional and well-known no further showing thereof need be made in the present instance in order to obtain a proper understanding of the invention.

From the above it will be seen that the vehicle is readily operable from either facing position and all steering, braking and speed controls are arranged for operation in the same manner and with the same foot regardless of which direction the operator faces. Although only a preferred form of the invention has been illustrated, and that form described in detail, it will be apparent to those skilled in the art that various modifications may be made therein without departing from the spirit of the invention or from the scope of the appended claims.

What is claimed is:

1. In a hydraulically powered and controlled vehicle having traction and steerable wheels with mechanism for steering the latter, and an operator's control station with a floor therein, the combination, comprising: an operator's seat; said seat being pivotally supported on said floor substantially midway fore-and-aft of said operator's station and rotatable about a vertical axis so as to selectively face forwardly or rearwardly; steering control mechanism including control valve means, fluid-carrying conduits adapted for communicatively connecting said valve means to a source of fluid pressure and to the mechanism for steering said steerable wheels, and an operator's steering wheel operable for actuating said valve means; means mounting said steering control mechanism for positioning of said steering wheel adjacent said seat; said steering control mechanism being swingable in a vertical fore-and-aft extending plane for positionable use with each position of said seat; a plurality of food operated controls; means connecting said latter controls with the instrumentalities to be operated thereby, whereby one of the foot controls, whether facing in one direction or the other, is operated by the same foot of an operator, and whereby another of the foot controls is operated transposed between a forwardly and a rearwardly facing position of an operator.

2. In a hydraulically powered and controlled vehicle having traction and steerable wheels with a hydraulic device for steering the latter, a speed governing device, individual traction wheel braking devices and an operator's control station with a floor therein, the combination, comprising: an operator's seat; said seat being pivotally supported on said station floor substantially medially of fore-and-aft boundaries of said operator's station and rotatable about a vertical axis so as to selectively be faced forwardly or rearwardly; steering control mechanism including control valve means, fluid-carrying conduits adapted for communicatively connecting said valve means to a source of fluid pressure and to the hydraulic device for steering said steerable wheels, and an operator's steering wheel operable for actuating said valve means; means rotatably mounting said steering control mechanism on said vehicle and having said mechanism rotatable in a vertical fore-and-aft extending plane for positioning said steering wheel adjacent said seat for use therewith in each facing position of said seat; a plurality of foot operated controls; separate means connecting said latter controls respectively with said speed governing device and with each of said wheel braking devices, whereby the speed governing device, whether the operator is facing in one direction or the other, is operated by the same foot and whereby the operator's right foot operates the right wheel brake and the left foot the left wheel brake corresponding to the direction the operator faces.

3. In a hydraulically powered and controlled vehicle having traction and steerable wheels with mechanism for steering the latter, and an operator's control station with a floor therein, the combination, comprising: an operator's seat; said seat being pivotally supported on said floor substantially midway fore-and-aft of said operator's station and rotatable about a vertical axis so as to selectively face forwardly or rearwardly; steering control mechanism including control valve means, fluid-carrying conduits adapted for communicatively connecting said valve means to a source of fluid pressure and to the mechanism for steering said steerable wheels, and an operator's steering wheel operable for actuating said valve means; means mounting said steering control mechanism for positioning of said steering wheel adjacent said seat; said mounting means including a support arm having one end thereof pivotally mounted on said vehicle at a place laterally displaced from said seat pivot, the opposite end of said arm being inwardly turned, and having said control valve means mounted on said opposite end with said steering wheel being operatively connected to said valve means; said arm being swingable in a vertical fore-and-aft extending plane with said steering wheel being positionable adjacent said seat for use therewith in each facing position of said seat; additional vehicle controls disposed at one side of said station and adapted for operative use in each selectable position of said seat; a plurality of foot operated controls; means connecting said latter controls with the instrumentalities to be operated thereby, whereby one of the foot controls, whether facing in one direction or the other, is operated by the same foot of an operator, and whereby the other foot controls are operated transposed between a forwardly and a rearwardly facing position of an operator.

4. In a hydraulically powered and controlled vehicle having a chassis structure, and traction and steerable wheels with mechanism for steering the latter, and an operator's control station with a floor therein mounted on said structure, the combination, comprising: support means mounted on said floor intermediate fore-and-aft boundaries of said station; an operator's seat pivotally carried by said support means and being rotatable about a vertical axis so as to selectively face forwardly or rearwardly; a boom-like arm having one end thereof pivotally supported by said structure at a place laterally displaced from said seat support means, the opposite end of said arm being inwardly turned; control valve means mounted on the inwardly turned end of said arm, and having a valve operating spindle extending outwardly from opposite sides of said valve means; flexible fluid-carrying conduits communicatively connected to said control valve means and adapted for communicatively interconnecting said valve means between a source of fluid pressure and the mechanism for steering said steerable wheels; means of mounting an operator's steering wheel selectively on one end or the other of said spindle for operating said valve means; said arm and said control valve means being swingable in a vertical fore-and-aft extending plane, and having said means mounting an operator's steering wheel cooperative therewith for positioning said operator's steering wheel adjacent said seat whereby said latter wheel is positioned for use with each facing position of said seat; a plurality of foot operated controls, and means connecting said latter controls with the instrumentalities to be operated thereby; said latter controls being duplicated fore-and-aft of said station and disposed so as to be operative selectively from either a forwardly or rearwardly facing position of an operator.

5. In a hydraulically powered and controlled vehicle having a chassis structure, pairs of traction and steerable wheels with mechanism for steering the latter, an operator's control station with a floor therein mounted on said structure, a speed governing device, and a braking device on each traction wheel, the combination, comprising: an operator's seat; seat support means mounted on said floor intermediate fore-and-aft boundaries of said station; said seat being pivotally carried by said support means and rotatable about a vertical axis so as to selectively face forwardly or rearwardly; a support arm having one end thereof pivotally supported by said chassis structure laterally displaced from said seat support means, the opposite end of said arm being inwardly turned; control valve means mounted on the inwardly turned end of said arm, and having a valve operating spindle extending outwardly from opposite sides of said valve means; flexible fluid-carrying conduits communicatively connected to said control valve means and adapted for communicatively interconnecting said valve means between a source of fluid pressure and the mechanism for steering said steerable wheels; bracket reinforcing means pivotally connected at one end to said control valve means; socket means mounted on the chassis structure and arranged to receive in an interlockable relation an opposite end of said bracket means for rigidly supporting said control valve means in an operating position thereof; means mounting an operator's steering wheel selectively on one end or the other of said spindle for operating said valve means; said support arm being swingable in a vertical fore-and-aft extending plane; said means mounting said operator's steering wheel on said spindle being cooperative with said arm and said valve means for positioning said operator's steering wheel adjacent said seat whereby said latter wheel is positioned for use with each facing position of said seat; a plurality of foot operated controls, and separate means connecting said latter controls respectively with said speed governing device and with each of said wheel braking devices; said foot controls being duplicated fore-and-aft of said station and disposed so as to be operative selectively from either a forwardly or a rearwardly facing position of an operator seated in said seat.

6. The invention according to claim 5 and further characterized in that the brake operating foot controls and the associated means connecting said controls to the respective wheel braking devices are disposed and arranged so that in a forwardly facing position of the operator the control on the right-hand side is operative to effect operation of the braking device of the traction wheel on the same side while the control on the left-hand side operates the braking device of the traction wheel on the other side, and in a rearwardly facing position of the operator the control on the right-hand side operates the braking device of the traction wheel on the right-hand side when facing rearwardly while the control on the left-hand side operates the braking device of the traction wheel on the left-hand side when facing rearwardly.

7. In a hydraulically powered and controlled vehicle having a chassis structure, pairs of traction and steerable wheels with mechanism for steering the latter, an operator's control station with a floor therein mounted on said structure, a speed governing device, and a braking device on each traction wheel, the combination, comprising: an operator's seat; seat support means mounted on said floor intermediate fore-and-aft boundaries of said station, said seat being pivotally carried by said support means and rotatable about a vertical axis so as to selectively face forwardly or rearwardly; a support arm having one end thereof pivotally supported by said chassis structure laterally displaced from said seat support means, the opposite end of said arm being inwardly turned; control valve means mounted on the inwardly turned end of said arm, and having a valve operating spindle extending outwardly from opposite sides of said valve means; flexible fluid-carrying conduits communicatively connected to said control valve means and adapted for communicatively interconnecting said valve means between a source of fluid pressure and the mechanism for steering said steerable wheels; bracket reinforcing means pivotally connected at one end to said control valve means; socket means affixed to the chassis structure and fashioned to receive in close fit relation an opposite end of said bracket means for rigidly supporting said control valve means in an operating position thereof; latching means cooperative between the opposite end of said bracket means and said socket means and operative to rigidly connect said bracket to said structure selectively in either a forwardly or a rearwardly facing position of the control valve means; readily detachable means mounting an operator's steering wheel selectively on one end or the other of said spindle for operating said valve means; said support arm being swingable in a vertical fore-and-aft extending plane; said means mounting said operator's steering wheel on said spindle being cooperative with said arm and said valve means for positioning said operator's steering wheel adjacent said seat whereby said latter wheel is positioned for use with each facing position of said seat; additional vehicle controls supportably mounted by said structure at one side of said station and adapted for operative use in any selected position of said seat; a plurality of foot operated controls, and separate means connecting said foot controls respectively with said speed governing device and with each of said wheel braking devices; said foot controls being duplicated fore-and-aft of said station and disposed and arranged so as to be operative selectively from either a forwardly or a rearwardly facing position of an operator seated in said seat.

8. In a hydraulically powered and controlled vehicle having a chassis structure, pairs of traction and steerable wheels with mechanism for steering the latter, an operator's control station with a floor therein mounted on said structure, a speed governing device, and a braking device on each traction wheel, the combination, comprising: an operator's seat; seat support means mounted on said floor intermediate fore-and-aft boundaries of said station; said seat being pivotally carried by said support means and rotatable about a vertical axis so as to selectively face forwardly or rearwardly; a boom-like arm having one end thereof pivotally supported by said chassis structure in an area laterally displaced from said seat support means, the opposite end of said arm being inwardly turned; control valve means mounted on the inwardly turned end of said arm, and having a valve operating spindle extending outwardly from opposite sides of said valve means; flexible fluid-carrying conduits communicatively connected to said control valve means and adapted for communicatively interconnecting said valve means between a source of fluid pressure and the mechanism for steering said steerable wheels; bracket reinforcing means pivotally connected at one end to said control valve means; socket means mounted on the chassis structure and fashioned to receive in an interlockable relation an opposite end of said bracket means for rigidly supporting said control valve means in an operating position thereof; means detachably mounting an operator's steering wheel selectively on one end or the other of said spindle for operating said valve means; said boom-like arm being swingable in a vertical fore-and-aft extending plane; said means mounting said operator's steering wheel on said spindle being cooperative with said arm and said valve means for positioning said operator's steering wheel adjacent said seat whereby said latter wheel is positioned for use with each facing position of said seat; a plurality of foot operated controls, a first one of which is operative for controlling said speed governing device and second and third ones of which are operative for controlling respective ones of said wheel braking devices; said foot operated controls being duplicated fore-and-aft of said station to provide first, second and third sets; first motion-transmitting linkage means connecting said first set with said speed governing device; second motion-transmitting linkage means connecting said second set with one of said braking devices; third motion-transmitting linkage means connecting said third set with another of said braking devices; said linkages being disposed and arranged so as to permit said foot controls to be operated selectively from either a forwardly or a rearwardly facing position of an operator seated on said seat.

9. The invention according to claim 5 and further characterized in that the axis of rotation of said operator's steering wheel relative to the associated said control valve means is disposed so that said axis lies in a vertical plane that extends fore-and-aft of the operator's station and passes through the vertical axis of rotation of said operator's seat.

10. In a hydraulically powered and controlled vehicle having a chassis structure, pairs of traction and steerable wheels with mechanism for steering the latter, an operator's control station with a floor therein mounted on said structure, a speed governing device, and a braking device on each traction wheel, the combination, comprising: an operator's seat; seat support means mounted on said floor intermediate fore-and-aft boundaries of said station; said seat being pivotally carried by said support means and rotatable about a vertical axis so as to selectively face forwardly or rearwardly; a support arm having one end thereof pivotally supported by said chassis structure laterally displaced from said seat support means, the opposite end of said arm being inwardly turned; control valve means mounted on the inwardly turned end of said arm, and having a valve operating spindle extending outwardly from opposite sides of said valve means; flexible fluid-carrying conduits communicatively connected to said control valve means and adapted for communicatively interconnecting said valve means between a source of fluid pressure and the mechanism for steering said steerable wheels; bracket reinforcing means pivotally connected at one end to said control valve means; separate socket means spaced fore-and-aft of the operator's station and fixedly supported by said chassis structure; said socket means being positioned and arranged to receive in a selectively supporting relation an opposite end of said reinforcing bracket for rigidly supporting said control valve means in each fore-and-aft displaced operating position thereof; latching means cooperative between the opposite end of said bracket means and each said socket means and operative to rigidly connect said bracket selectively to each said socket means in either a forwardly or rearwardly operating position of the control valve means; readily detachable means mounting an operator's steering wheel selectively on one end or the other of said spindle for operating said valve means; said support arm being swingable in a vertical fore-and-aft extending plane; said means mounting said operator's steering wheel on said spindle being cooperative with said arm and said valve means for positioning said operator's steering wheel adjacent said seat whereby said latter wheel is positioned for use with each facing position of said seat; additional vehicle controls supportably mounted by said structure at one side of said station and adapted for operative use in any selected position of said seat; a plurality of foot operated controls, and separate means connecting said foot controls respectively with said speed governing device and with each of said wheel braking devices; said foot controls being duplicated fore-and-aft of said station and disposed and arranged so as to be operative selectively from either a forwardly or a rearwardly facing position of an operator seated in said seat.

References Cited by the Examiner

UNITED STATES PATENTS

| | | | |
|---|---|---|---|
| 2,529,192 | 11/1950 | Rossner | 180—77 X |
| 2,935,892 | 5/1960 | Hodek | 180—77 X |

FOREIGN PATENTS

| | | |
|---|---|---|
| 1,057,583 | 10/1953 | France. |
| 1,236,803 | 6/1960 | France. |

A. HARRY LEVY, *Primary Examiner.*